United States Patent [19]
Formo

[11] 3,732,969
[45] May 15, 1973

[54] ARTICLE GROUP-SEGREGATING MECHANISM
[75] Inventor: Alvin C. Formo, Seattle, Wash.
[73] Assignee: Formost Packaging Machines, Inc., Seattle, Wash.
[22] Filed: Dec. 14, 1970
[21] Appl. No.: 97,784

[52] U.S. Cl. .................. 198/34, 198/103, 53/159
[51] Int. Cl. .................... B65b 35/30, B65g 47/26
[58] Field of Search ............... 198/20, 21, 34, 103; 53/159, 164

[56] References Cited

UNITED STATES PATENTS

| | | | |
|---|---|---|---|
| 2,313,706 | 3/1943 | Willoughby | 198/21 |
| 3,289,867 | 12/1966 | Burke | 198/34 X |
| 3,385,417 | 5/1968 | Dixon | 198/25 |

Primary Examiner—Edward A. Sroka
Attorney—Robert W. Beach

[57] ABSTRACT

Articles from which a group is to be segregated are fed in two parallel rows alongside each other until such rows are stopped by clamping means actuated by engagement of the end of the group to be segregated with a stop. Adjacent arms of counterrotating rotors lift the group of articles to be segregated from the infeed path to a parallel discharge path along which a pusher moves to push the segregated article group to a bagging station for bagging. Upon transfer of the segregated article group from the feed path to the discharge path the clamping means are released so that feed of articles from the feed section to the segregating section is resumed.

5 Claims, 13 Drawing Figures

PATENTED MAY 15 1973

INVENTOR.
ALVIN C. FORMO
BY
Robert W. Beach
ATTORNEY

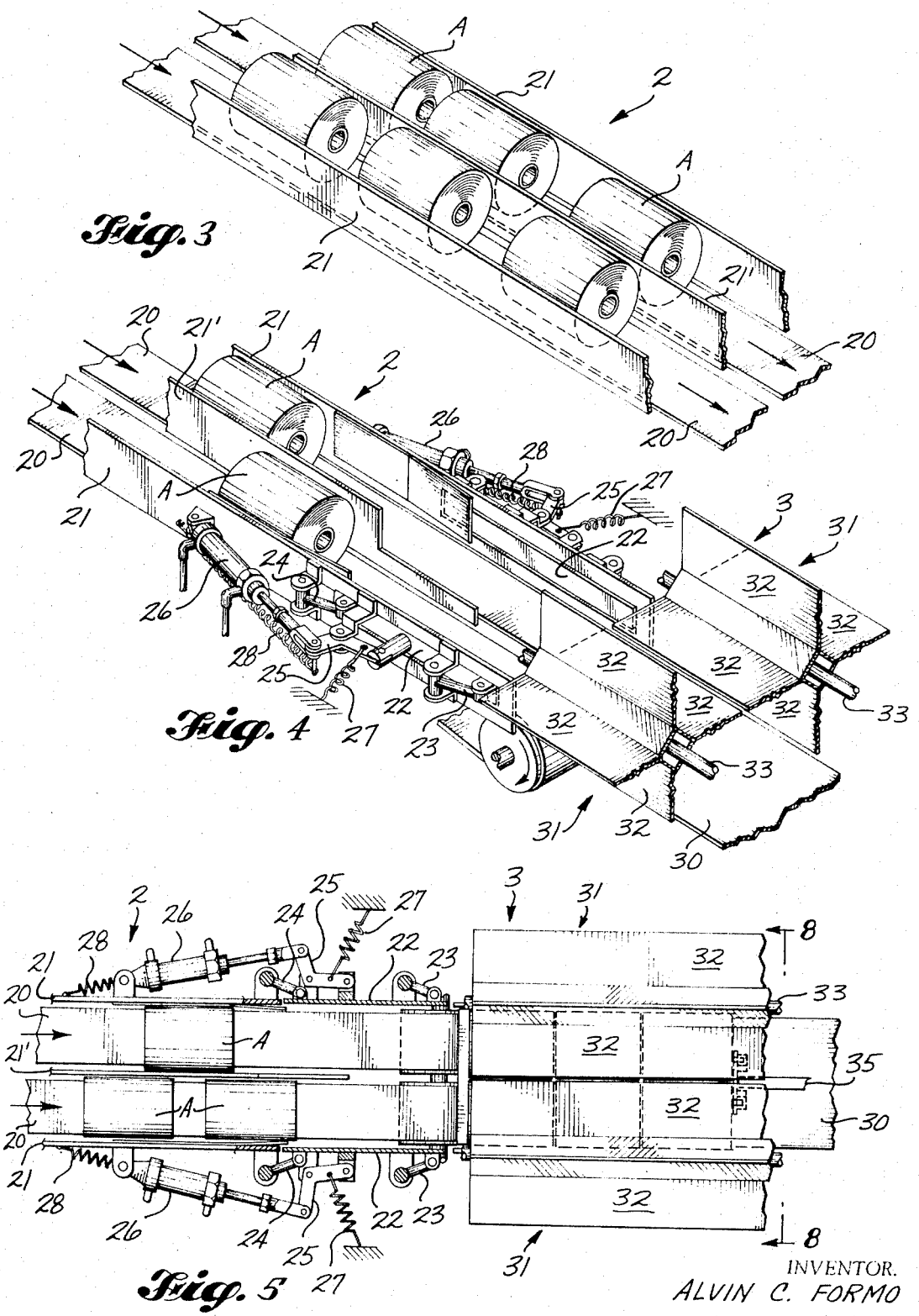

INVENTOR.
ALVIN C. FORMO
BY
ATTORNEY

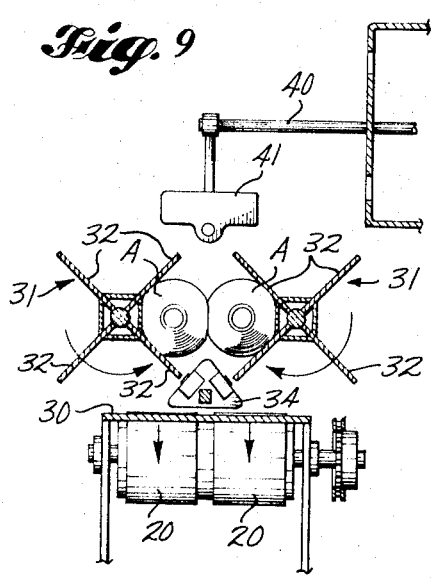
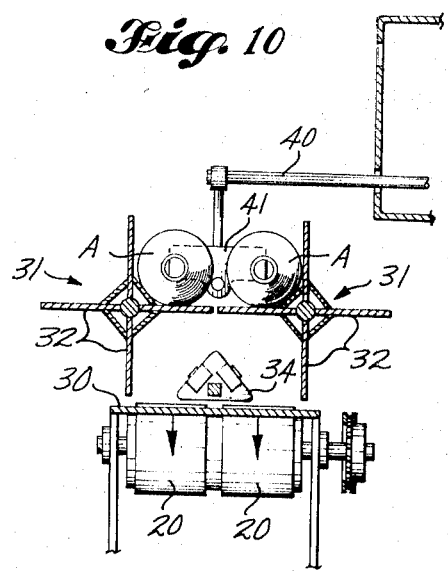
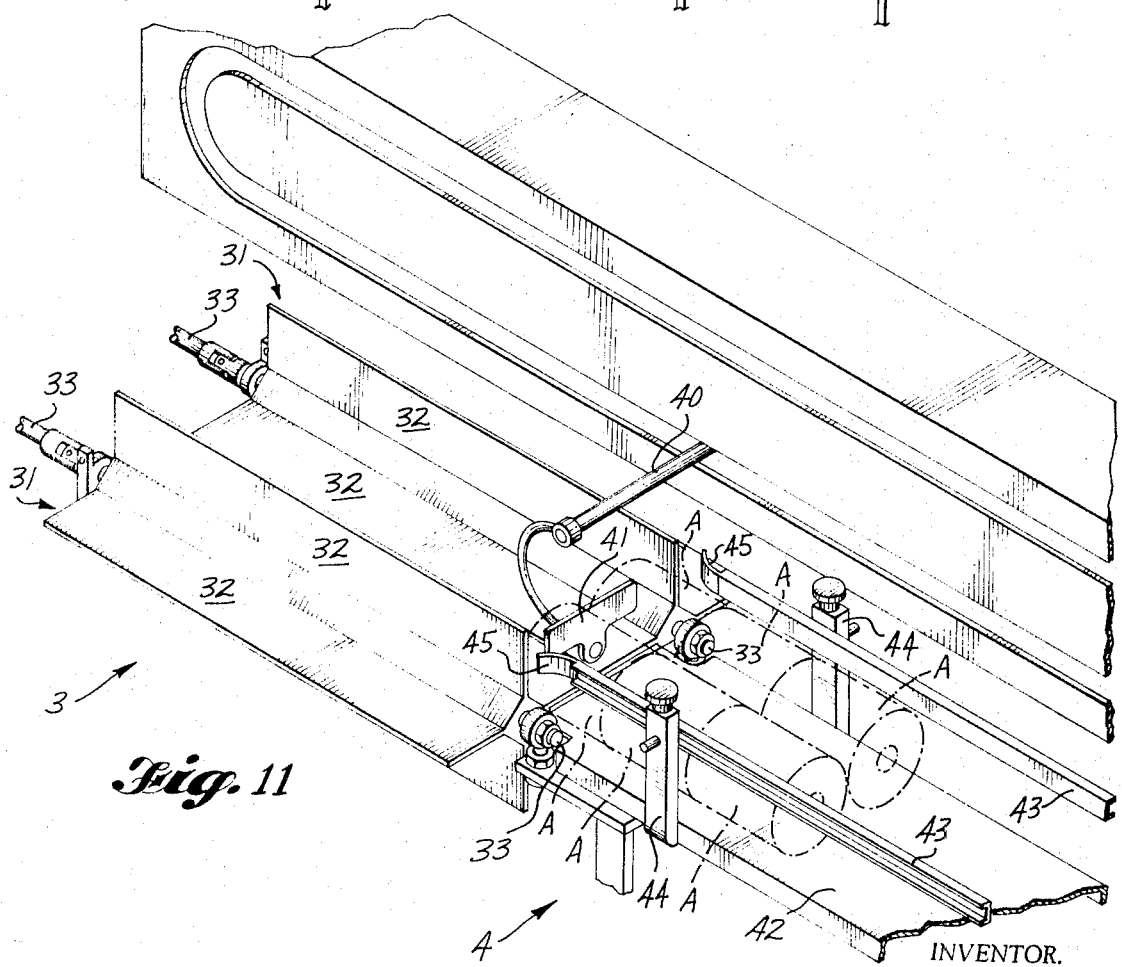

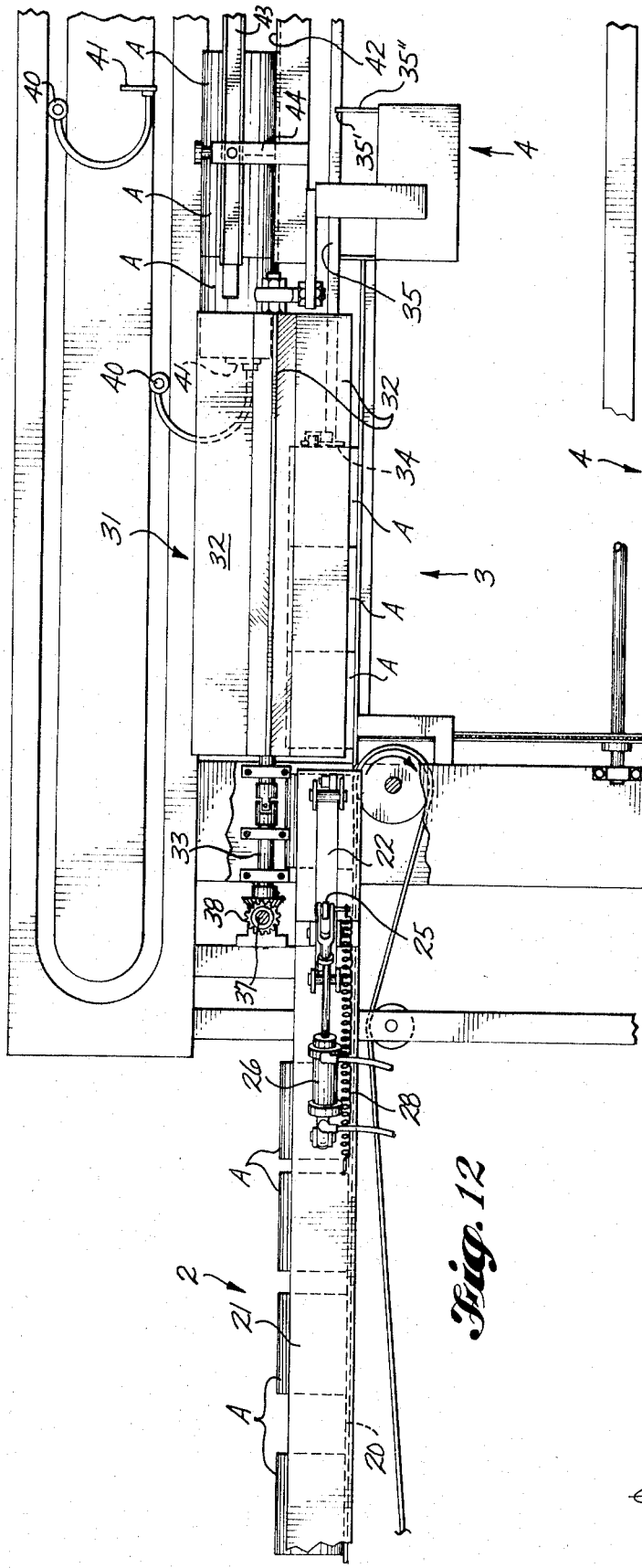

ARTICLE GROUP-SEGREGATING MECHANISM

This invention relates to mechanism for transforming a supply of articles to be bagged from a continuous feed into a feed of such articles in segregated groups.

Heretofore transformation of a supply of articles from a continuous feed to a group feed has usually been accomplished by pushing a group of articles from a supply path to a discharge path by reciprocating mechanism which intercepted the supply path and blocked it until the segregating mechanism had been retracted from the supply path.

A principal object of the present invention is to provide mechanism for segregating automatically and expeditiously successive groups of articles each including a predetermined number from a continuous supply of articles.

Another object is to provide group-segregating mechanism which will operate quickly without damaging the articles being segregated, yet which will be of simple construction.

A further object is to provide segregating mechanism which is very flexible in operation in that it can be adapted or designed to segregate groups of different types and sizes of articles into groups of various selected numbers.

It is also an object to provide segregating mechanism which is readily accessible for servicing, such as for cleaning, for removal of defective articles, or for clearing a jammed condition.

FIG. 3 is a top perspective of a portion of the feed section.

FIG. 4 is a top perspective of a portion of the feed section and a portion of the group-segregating section.

FIGS. 5 and 6 are plans of adjacent portions of the feed section and of the group-segregating section, showing parts in different operative positions.

FIGS. 8, 9 and 10 are transverse sections through the group-segregating section taken on line 8—8 of FIG. 5 and showing parts in different operative positions.

FIG. 11 is a top perspective of the group-segregating section and an adjacent portion of the bagging section.

FIG. 12 is a side elevation of a portion of the feed section, the group-segregating section and an adjacent portion of the bagging section, parts being broken away.

FIG. 13 is a side elevation of a portion of the bagging section.

The article group segregating mechanisms of the present invention is suitable for use with a bagging machine such as shown in U. S. Pat. No. 3,508,379, which was designed for bagging individual articles. The present mechanism is illustrated as being used to segregate rolls of toilet tissue into groups so that each group is packaged in a separate bag, but mechanisms utilizing the principle of the present invention can be used for packaging groups of articles of different types and sizes, although the articles should be of substantially circular cross section, such as being cylindrical or perhaps spherical, and may be hollow or solid.

Figure 1:
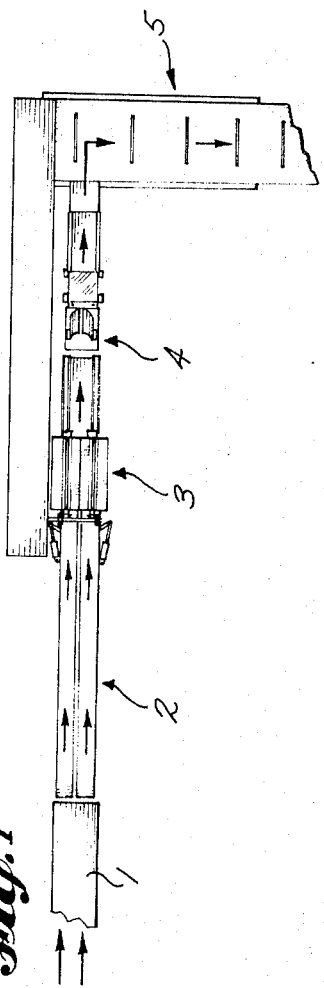
FIG. 1 is a somewhat diagrammatic plan of the entire supply, feeding, segregating, bagging and removing mechanism.

The articles are supplied to the bagging machine from a supply section 1 shown in FIG. 1, which could be a hopper arrangement or the output from article-manufacturing apparatus. The articles are fed to the article group-segregating mechanism in two rows on parallel adjacent transport or feed belts 20 with their substantially circular cross sections disposed transversely of the direction of feed movement. The articles are kept from falling from the feed belts by sides 21 extending along the feed section. Also, the rows of articles are separated by a divider plate 21' located between the feed belts and extending parallel to the walls 21.

Figure 6:
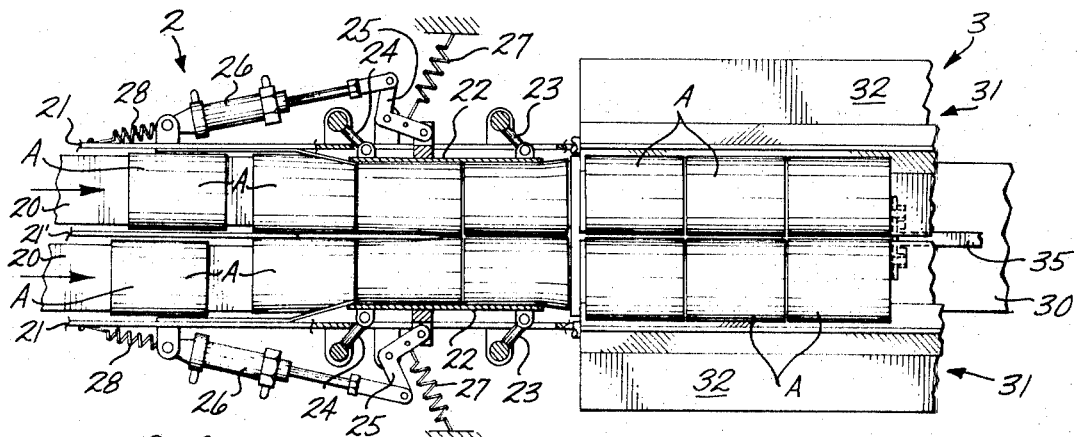

At the location of the feed section 2 adjacent to the article group-segregating section 3 the rows of articles pass between opposed clamping plates 22, as shown best in FIGS. 5 and 6. These clamping plates are supported by parallel links 23 and 24 for movement between the unclamped relationship shown in FIG. 5 and the article-clamping relationship shown in FIG. 6. Approach and separating movement of the clamping plates is effected by swinging of the bell cranks 25, each having one arm connected to a plate 22. The other arm of each bell crank is connected to a fluid pressure operated actuating jack 26 preferably operated by air under pressure.

Tension springs 27 connected to the bell cranks 25 urge such bell cranks in a direction to hold the clamping plates 22 spread apart in unclamped relationship. Also, tension springs 28 extending parallel to the actuating jack cylinders 26 urge the actuators and bell cranks in a direction to hold the clamping plates 22 in or move them toward unclamped relationship. If one of the springs 27 and 28 should fail, therefore, and the actuator jack should fail, the clamping plate will still be moved by the other spring into its unclamped position so as not to obstruct movement of articles by the transport belts 20.

From the feed section articles to be grouped are moved by the belts 20 into the group-segregating section 3, where they are supported by plate 30 substantially coplanar with the transport belts, as shown in FIG. 12. Such article-supporting plate is disposed beneath the group-segregating rotors 31, the arms 32 of which form shelves projecting radially outward from the rotor core and movable always unidirectionally through the group-segregating section in a direction transversely of the direction of article movement. Each rotor is supported and rotated by a shaft 33 turning always unidirectionally, which shafts are mounted in parallel relationship above the opposite longitudinal edges of the supporting plate 30, respectively.

Figure 8:
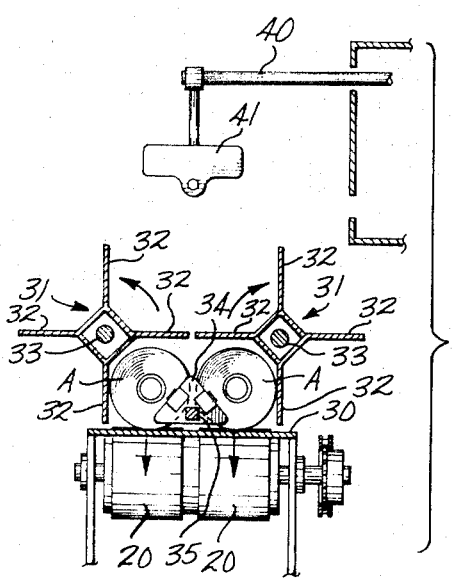

When the group-segregating mechanism is in article-receiving condition, the rotors 31 will be in rotative positions such that adjacent shelves 32 are disposed in coplanar relationship above the article-supporting plate 30, as shown in FIG. 8, to provide a chamber between the plate 30 and the shelf members 32 above it for reception of articles from belts 20. Rotor arm members 32 projecting vertically downward from the rotors, as shown in this figure, form opposite sides of the article-receiving chamber.

Figure 2:
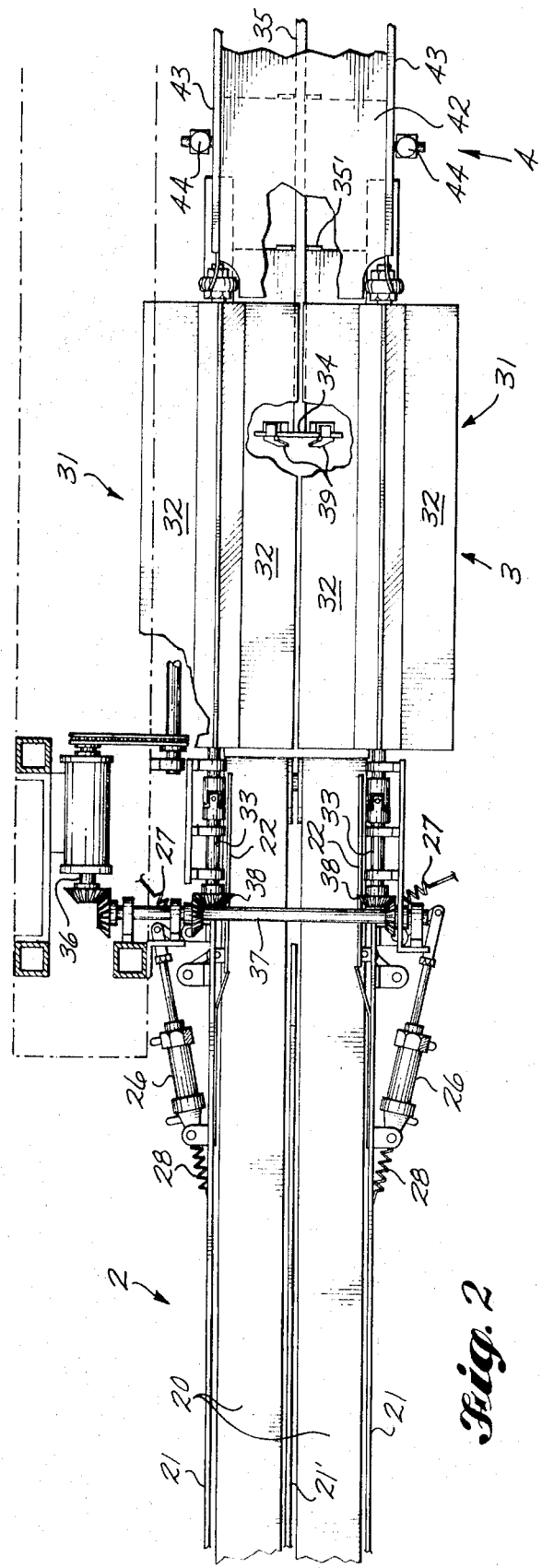
FIG. 2 is an enlarged plan of a portion of the feed section, of the group-segregating and transfer section and of a portion of the bagging section.
Figure 7:
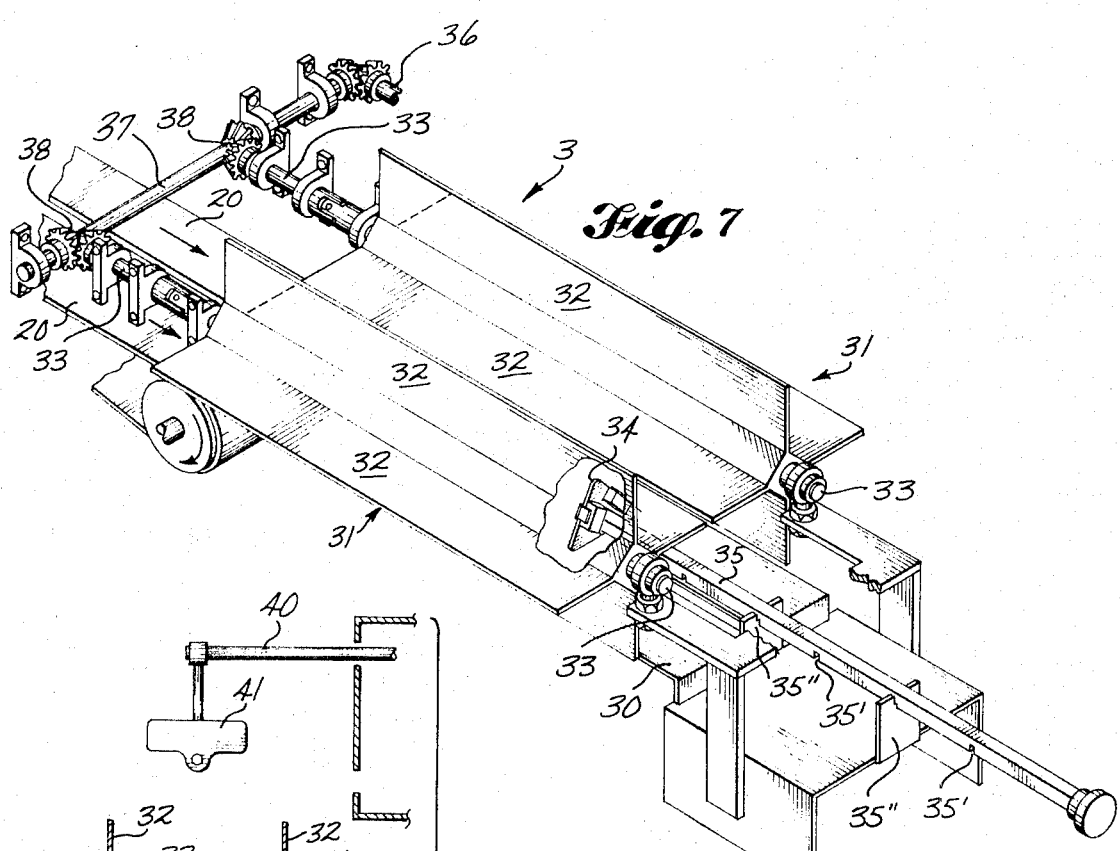
FIG. 7 is a top perspective of the group-segregating section.

Articles are moved by transport belts 20 from the feed section into the group-segregating section when the clamping plates 22 are in their retracted positions shown in FIG. 5. Movement of articles into the group-segregating section chamber is limited by a stop 34 mounted on the end of a slide bar 35. The length of such bar extends lengthwise of the article-receiving chamber between the rotors, as shown in FIGS. 2, 7 and 8.

The position of the stop longitudinally of the group-segregating section can be varied depending upon the extent of each article lengthwise of the supporting plate 30 and the number of such articles arranged in a row along that plate which it is desired to include in a single group. The bar has notches 35' at locations spaced along its lower side, as shown in FIG. 7, and is slidably supported in notches of plates 35'' spaced lengthwise of the bar. The spacing of such supporting plates is equal to the spacing of the bar notches 35' or a multiple of such spacing, so that the bar can be positioned with two of its notches 35' engaged respectively with the two bar-supporting plates 35'' to hold the stop 34 securely in a definitely adjusted position.

The rotors 31 are rotated always unidirectionally so that each rotates in the direction opposite to the direction of rotation of the other rotor by drive mechanism including a drive shaft 36 suitably connected, such as by bevel gearing, to a cross shaft 37 connecting the two parallel rotor shafts 33 by bevel gearing 38. Such bevel gearing is arranged so that the left shaft 33, as seen in FIG. 8, is driven to rotate always in a counterclockwise direction, whereas the right shaft 33 is driven to rotate always in a clockwise direction.

Energization of the drive mechanism for rotating the two rotors 31 is accomplished by reception in the group-segregating mechanism of the proper number of articles to form a group. When the proper number has been pushed by the feed belts 20 into the group-segregating section, the leading units of the group of articles will be pressed against the actuating leaves 39 of the rotor drive-energizing switches to effect energization of the drive mechanism to rotate rotor drive shaft 36. It will be noted in FIG. 2 that the two switch leaves 39 are disposed respectively in alignment with the two different rows of articles A. The two switches actuated by the leaves 39 are connected in series in the rotor drive mechanism energizing circuit, so that it is necessary for both of such leaves to be swung into operative position by engagement with them of articles A in the two rows before the rotor drive mechanism will be energized.

When the drive mechanism for rotating shaft 36 is thus energized it will turn the two rotors 31 conjointly from the position shown in FIG. 8 through the position of FIG. 9 to the position of FIG. 10. The drive mechanism will then be deenergized automatically until both actuating leaves 39 are again depressed to energize the rotor drive mechanism for indexing both rotors to turn conjointly through another one-quarter revolution increment.

Sufficient pressure to depress the switch leaves 39 for actuation of their switches can only be exerted by the articles A when a column of such articles is pushed into the group-segregating section by the transport belts 20 of the feed section. Such operation insures that the desired group of articles to be segregated has been delivered to the group-segregating mechanism before the rotors are energized. Rotation of the rotors in the respectively opposite directions indicated by the arrows in FIG. 8 will cause the downwardly projecting shelves 32 to swing toward each other so that the articles A will be scooped up between such shelves.

Since the group of articles is confined in the pockets formed by the shelves, the articles in the two rows may be pressed against each other to some extent, as shown in FIG. 9. When they have been elevated to the position of FIG. 10, however, the articles of the group thus segregated will be supported on the horizontal shelves 32 in free condition to be pushed out of the space between the upwardly projecting shelves. Also, as soon as the articles of the group have substantially reached the elevated position shown in FIG. 10, it will be observed that the space beneath the inner horizontal shelves 32 has been cleared so that the clamping plates 22 can be retracted from their clamping positions shown in FIG. 6 to release the articles between such plates for movement by belt 20 into the space below such shelves. Since the segregating mechanism clears the space for receiving additional articles substantially simultaneously with removal of the group of articles from such space, the group-segregating procedure is greatly expedited over the operation of the reciprocating type of group-segregating mechanism.

During such group-segregating operation it is necessary to prevent movement of additional articles from the feed section 2 into the group-segregating section 3 so as to avoid interference with the rotation of the rotors 31. While movement of the belts 20 could be interrupted to accomplish this purpose, it is preferred that such belts 20 continue to move uninterruptedly and that feed of articles from the feed section into the group-segregating section be prevented by clamping the articles in the feed section adjacent to the group-segregating section, so that the feed belts will merely slide under such clamped articles and will continue to move additional articles toward such clamped articles.

The articles A usually are moved by the feed belts 20 with spaces between them, as shown in FIG. 3, which may vary to a greater or lesser extent. When the articles of a group to be segregated have been moved into the group-segregating section 3, however, as shown in FIG. 6, they should be tight together. It is also desirable for the articles in the feed section adjacent to the group-segregating section to be substantially in abutment as shown in FIG. 6. Only when the articles adjacent to the group-segregating section are in abutment is it possible for the belts 20 to exert sufficient force through them to press the grouped articles in the group-segregating section firmly against the switch-actuating means 39.

When the articles A in the portion of the feed section adjacent to the group-segregating section have been moved into abutment, as shown in FIG. 6, the clamping plates 22 can be moved from the released position of FIG. 5 into the clamping position of FIG. 6 by actuation of the jacks 26. Prior to engagement of such clamping plates with the articles A adjacent to the segregating mechanism, such articles are in abutment with the adjacent articles in the group-segregating section, as mentioned above. In order to avoid interference of the articles in the feed section with segregating movement of the articles in the group-segregating section, it is desirable for such articles to be shifted apart slightly, as shown in FIG. 6. This action is accomplished by the component of movement of clamping plates 22 lengthwise of belts 20 in the direction opposite to such belt movement, because such clamping plates are carried by the swinging arms 23 and 24. As such plates grip and compress the articles A to some extent, the articles in the feed section adjacent to the group-segregating section will be shifted backward a short distance away from the group-segregating section to provide the gap shown in FIG. 6 between the articles at the junction of the feed section and the group-segregating section.

Operation of the jacks 26 to effect clamping of articles at the end of the feed section 2 can be coordinated with group-segregating rotation of the rotors 31 by actuating both of these components by closing of the switches resulting from depression of the switch-actuating leaves 39 effected by engagement of the articles A in the group-segregating section with such leaves. Such jacks will remain energized until the rotors 31 have been indexed through substantially a quarter turn to the position of FIG. 10. The jacks can be deenergized either by a time delay operation or by a limit switch operated by rotation of rotors 31, so that the transport belt 20 can move the unclamped articles from the feed section into the group-segregating section for segregation of the next group.

From the raised position shown in FIGS. 6 and 10 resting on the coplanar shelves 32 of the two rotors, the segregated group of articles is shifted from the group-segregating section 3 to the bagging section 4 shown in FIG. 1. Such shifting is effected by orbiting pusher-carrying rods 40 carrying pushers 41 which are driven and guided to move along a path between the upwardly projecting vanes 32 of the rotors 31 as shown in FIGS. 10, 11 and 12.

By such a pusher the segregated group of articles is pushed from the coplanar shelves 32 of the rotors 31 along the supporting plate or table 42. The articles are prevented from falling from such table by rails 43 supported along opposite sides of the table on posts 44. The ends 45 of such rails adjacent to the group-segregating section 3 are flared outwardly so that the rails will hold the grouped articles in compact relationship. A pusher 41 moves such a compact group to and across the article-supporting platform 46 at the bagging station 4 into the open mouth of a bag 47. The bag mouth can be spread to receive the group of articles by opening movement of jaws 48 inserted into the mouth of the bag. The group of articles is pushed between such jaws and through the bag mouth by movement of the pusher 41.

I claim:

1. Article-handling mechanism comprising feed means for moving a series of articles along a feed path in a predetermined direction, discharge means for moving articles successively along a discharge path elevationally separated from such feed path in a direction substantially parallel to such predetermined direction, two sets of shelves, two shelf-supporting means disposed at opposite sides, respectively, of the feed path and the discharge path supporting each shelf of said respective sets in cantilever fashion by one edge for disposition of cooperating shelves of the two sets in coplanar relationship in vertical registration with the feed path and the discharge path, and with the edges of said cooperating shelves adjacent to each other, the shelf edges adjacent to the feed path and the shelf edges adjacent to the discharge path being unobstructed by said shelf-supporting means, and moving means shifting said shelf-supporting means conjointly to move shelves of said two sets elevationally through the adjacent end portion of the feed path transversely of the direction of movement of articles along the feed path to transfer articles elevationally from the feed path to the discharge path for movement from the shelves along the discharge path by said discharge means.

2. The mechanism defined in claim 1, in which the shelf-supporting means includes two rotors disposed in side-by-side relationship and rotatable in opposite directions respectively about axes disposed parallel to the feed path and the discharge path, said rotors having cooperating arms forming the shelves.

3. Article group-segregating mechanism comprising feed means for moving two rows of articles in side-by-side relationship along a feed path, discharge means for moving pairs of articles from such two rows successively along a discharge path offset elevationally from such feed path, group-segregating means operable to receive a plurality of articles from the feed path and including two rotors disposed in side-by-side relationship, rotatable in opposite directions respectively about axes disposed parallel to and alongside the feed path and having arms engageable with a plurality of articles of a segregated group in both of such rows, and means turning said group-segregating rotors always unidirectionally to clear the feed path by transferring such plurality of articles from each row as a group from such feed path to such discharge path for movement along the discharge path by said discharge means.

4. Article group-segregating mechanism comprising feed means for moving a plurality of articles along a feed path, discharge means for moving groups of articles successively along a discharge path offset from such feed path, group-segregating means operable to receive a plurality of articles from the feed path, means for driving said feed means to move continuously, clamping means engageable with articles being moved by said feed means at the feed side of such plurality of articles for restraining movement of the articles following such plurality of articles by said feed means to said group-segregating means, and means moving said group-segregating means always unidirectionally to clear the feed path by transferring such plurality of articles as a group from such feed path to such discharge path for movement along the discharge path by said discharge means.

5. Article group-segregating mechanism comprising feed means for moving a plurality of articles along a feed path, discharge means for moving groups of articles successively along a discharge path offset from such feed path, group-segregating means operable to receive a plurality of articles from the feed path, means moving said group-segregating means always unidirectionally to clear the feed path by transferring such plurality of articles as a group from such feed path to such discharge path for movement along the discharge path by said discharge means, and clamping means engageable with articles moved by said feed means toward said group-segregating means for shifting such articles a short distance away from said group-segregating means and thereafter restraining movement of such articles during movement of said group-segregating means.

* * * * *